United States Patent [19]

Welker

[11] Patent Number: 5,579,803
[45] Date of Patent: Dec. 3, 1996

[54] CHROMATOGRAPH PROTECTION DEVICE

[75] Inventor: Brian H. Welker, Sugar Land, Tex.

[73] Assignee: Welker Engineering Company, Sugar Land, Tex.

[21] Appl. No.: 560,910

[22] Filed: Nov. 13, 1995

[51] Int. Cl.⁶ .............................. F16K 24/04; F16K 31/18
[52] U.S. Cl. .............................................. 137/202; 137/559
[58] Field of Search ........................................ 137/202, 559

[56] References Cited

U.S. PATENT DOCUMENTS

| | | | |
|---|---|---|---|
| 1,373,129 | 3/1921 | Green et al. | |
| 1,897,492 | 2/1933 | Ledoux | 137/559 |
| 2,037,245 | 4/1936 | Leifheit et al. | 137/103 |
| 2,485,437 | 10/1949 | Dwyer | 137/202 |
| 2,554,100 | 5/1951 | Facchini | 73/323 |
| 2,570,322 | 10/1951 | Christopher | 137/559 |
| 2,725,071 | 11/1955 | McKillop | 137/202 |
| 2,732,715 | 1/1956 | Hawkins | 73/323 |
| 2,812,772 | 11/1957 | Moore | 137/202 |
| 2,833,148 | 5/1958 | Hoyt et al. | 73/323 |
| 3,691,835 | 9/1972 | Metzger | 73/209 |
| 4,535,799 | 8/1985 | Boley | 137/174 |
| 4,640,304 | 2/1987 | Looney | 137/202 |
| 4,720,998 | 1/1988 | Hogue | 73/444 |
| 4,838,095 | 6/1989 | Sheridan et al. | 73/864.63 |
| 5,052,224 | 10/1991 | Ford et al. | 73/325 |
| 5,101,852 | 4/1992 | Magnasco | 137/174 |
| 5,213,586 | 5/1993 | Welker | 48/195 |

Primary Examiner—Gerald A. Michalsky
Attorney, Agent, or Firm—Herzog, Crebs & McGhee

[57] ABSTRACT

An apparatus is shown which prevents the intrusion of liquids into a gas chromatograph wherein a ball-check valve comprised of a flotation chamber and a spherical floatable valve element is positioned between and in fluid communication with an inlet and outlet port. While gasses are permitted to flow past the valve and into the gas chromatograph, liquids are retained within the flotation chamber by the floatable valve element. When the liquid level rises to a certain level within the chamber, the valve is closed by the pressure of the liquid forcing the floatable valve element into a closed and sealed position. The ball-check valve is also surrounded by a transparent member which allows the user to view the liquid level within the valve at all times.

14 Claims, 2 Drawing Sheets

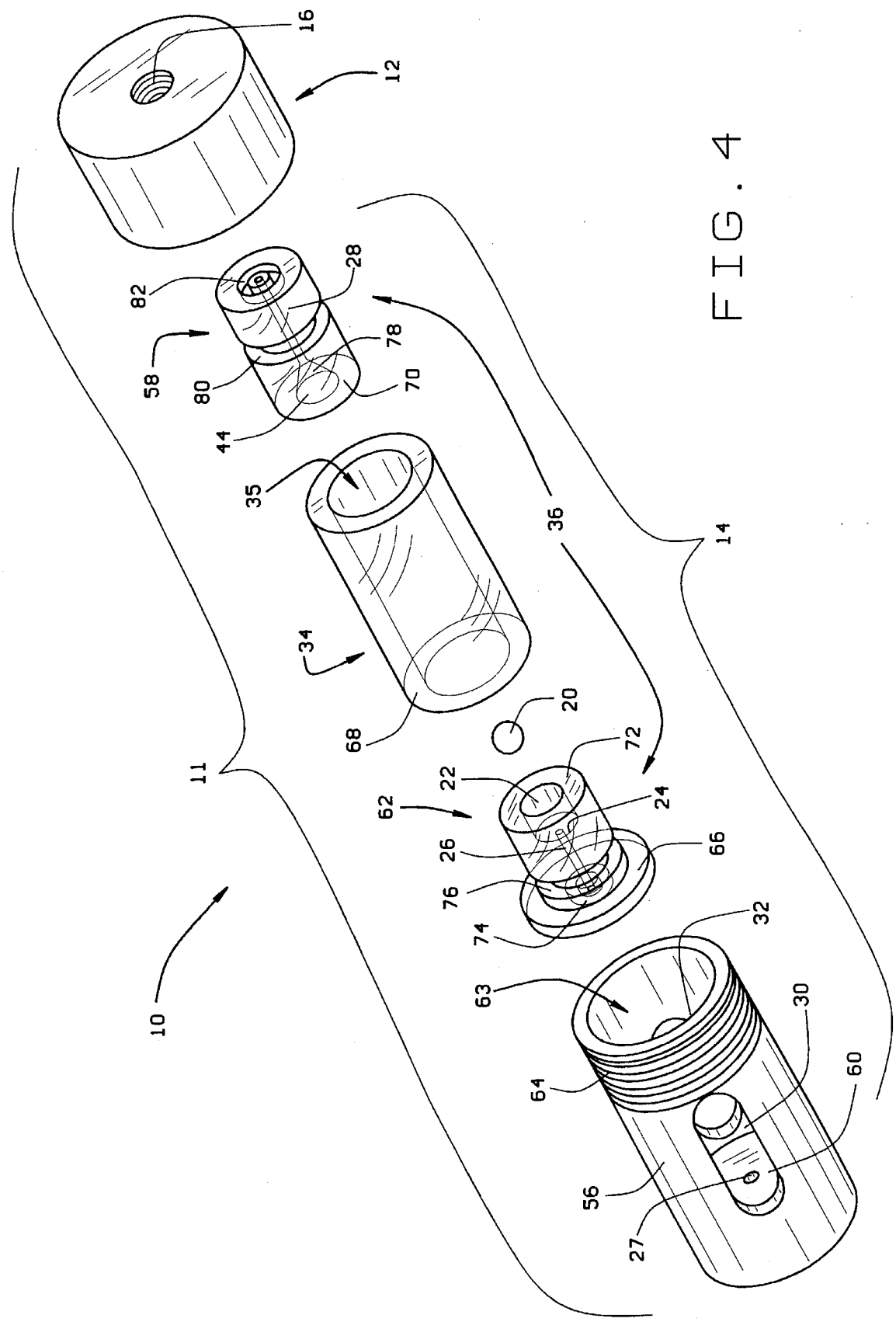

5,579,803

CHROMATOGRAPH PROTECTION DEVICE

BACKGROUND OF THE INVENTION

1. Field of the Invention

The present invention relates to the prevention of liquids into a gas chromatograph, and more particularly to an apparatus for allowing only gases to enter the gas chromatograph and not liquids.

2. Description of Related Art

A gas chromatograph is commonly used in the chemical industry for separating and analyzing a complex gaseous mixture. Oftentimes, the source of the gas mixture is a pipeline or a sample cylinder that contain liquids in addition to the gases to be separated. However, because the gas chromatograph is only capable of separating gases and not liquids, the intrusion of liquids into the gas chromatograph can cause flooding, which renders the gas chromatograph inoperative. The cost of repairing a flooded gas chromatograph is extremely expensive. Thus, the need for a low-cost device which reduces the incident of chromatograph flooding has increased.

A low-cost device which utilizes a ball-check valve assembly to prevent fluid flow into an air filter is disclosed in U.S. Pat. No. 5,213,586, entitled "Vent Check Valve," issued to Welker on May 25, 1993. The device is used with an odorant injection system and allows the free flow of air or gas therethrough during normal use and prevents the flow of fluid therefrom in the event of a system failure. The device includes an inlet opening, an outlet opening, and a flotation chamber with a floatable valve element positioned therebetween. When the system fails, the liquid level rises within the flotation chamber and the floatable valve element rises to a closed position in the top of the flotation chamber. The liquid is then prevented from overflowing into the air filter. A shortcoming of this device, however, is the fact that the user is unable to view the position of the floatable valve element within the flotation chamber. Furthermore, the configuration of the device does not allow for utilization with a chromatograph protector.

The use of flotation devices in glass tubes as viewable liquid level gauges is well-known in the art. For example, U.S. Pat. No. 1,373,129, entitled "Radiator Water Gauge," issued to Green et al., discloses an adjustable water gauge used to measure the amount of water in an automobile radiator. Other examples include: U.S. Pat. No. 2,554,100, entitled "Fluid Level Gauge," issued to Facchini, which allows the user to visibly determine the exact level of a fluid in a container at all times; U.S. Pat. No. 2,732,715 issued to Hawkins, entitled "Liquid Level Gauge," which is a gauge having a transparent tube at the exterior of a tank in which the liquid level of the tube is the same as in the tank; U.S. Pat. No. 2,833,148, entitled "Site Tank Gauge," issued to Hoyt, a site tank gauge in which the amount of fuel in a tractor can be measured; and, U.S. Pat. No. 5,052,224, entitled "Shielded Site Gauge for Storage Tanks," issued to Ford et al., which is a vertically mountable site gauge for visually determining the level or the volume, or both, of liquid stored in a container. Although these patents teach the use of flotation devices in glass tubes as viewable liquid level gauges, they do not teach the use of flotation devices in a transparent element as a viewable check valve.

With the above considerations in mind, it is an object of the present invention to provide a device which prevents the intrusion of liquids into a gas chromatograph.

It is a further object of the present invention to provide a device in which the user is able to visually determine the fluid level within the device at all times.

SUMMARY OF THE INVENTION

The present invention is an apparatus used to prevent the flooding of a gas chromatograph for a source of gas possibly containing liquids. The gas chromatograph protection apparatus is coupled between the inlet of the gas chromatograph and the outlet of the source of the gas to be analyzed. The apparatus includes a body having an inlet for fluid communication with the gas source and an outlet for fluid communication with the gas chromatograph. The inlet and outlet are in fluid communication via a valve that allows gas to pass therethrough but not liquids. The valve is encased in a seethrough housing, with the body including openings in order to view the valve through the see-through housing.

In one form, the apparatus generally includes a body defining an inlet assembly with a vertically extending inlet port threaded to an outlet assembly with a vertically extending outlet port. The inlet assembly retains a transparent housing. Within the transparent housing is a flotation chamber in communication with the inlet and outlet ports by means of an inlet and outlet channel, respectively. A floatable valve element freely movable within the flotation chamber defines a float valve to prevent the intrusion of fluids into the gas chromatograph. The floatable valve element rises and closes on a valve seat in the top of the flotation chamber by means of fluid pressure when fluid enters the flotation chamber. A pair of diametrically-opposed slots in the inlet assembly expose the transparent housing and thus the float valve so that the position of the floatable valve element can be viewed at all times.

More particularly, the transparent housing includes an inner transparent assembly and an outer transparent member, with the inner transparent valve assembly comprised of an upper valve portion and a lower valve portion. The outer transparent member surrounds the inner transparent valve assembly. O-rings are strategically disposed in and about the inner transparent valve assembly to prevent fluid leakage.

In the preferred form, the inlet assembly is cylindrical to define a cylindrical cavity for a cylindrical inner transparent assembly and a cylindrical outer member or sleeve that constitutes a transparent tube.

BRIEF DESCRIPTION OF THE DRAWINGS

The above-mentioned and other features, advantages and objects of this invention, in the manner in which they are obtained, will become more apparent and will be best understood by reference to the detailed description in conjunction with the accompanying drawings which follow, wherein:

FIG. 4 is an exploded view of the chromatograph protection device of the present invention showing with particularity the constituent parts.

DESCRIPTION OF THE PREFERRED EMBODIMENTS

Figure 1:
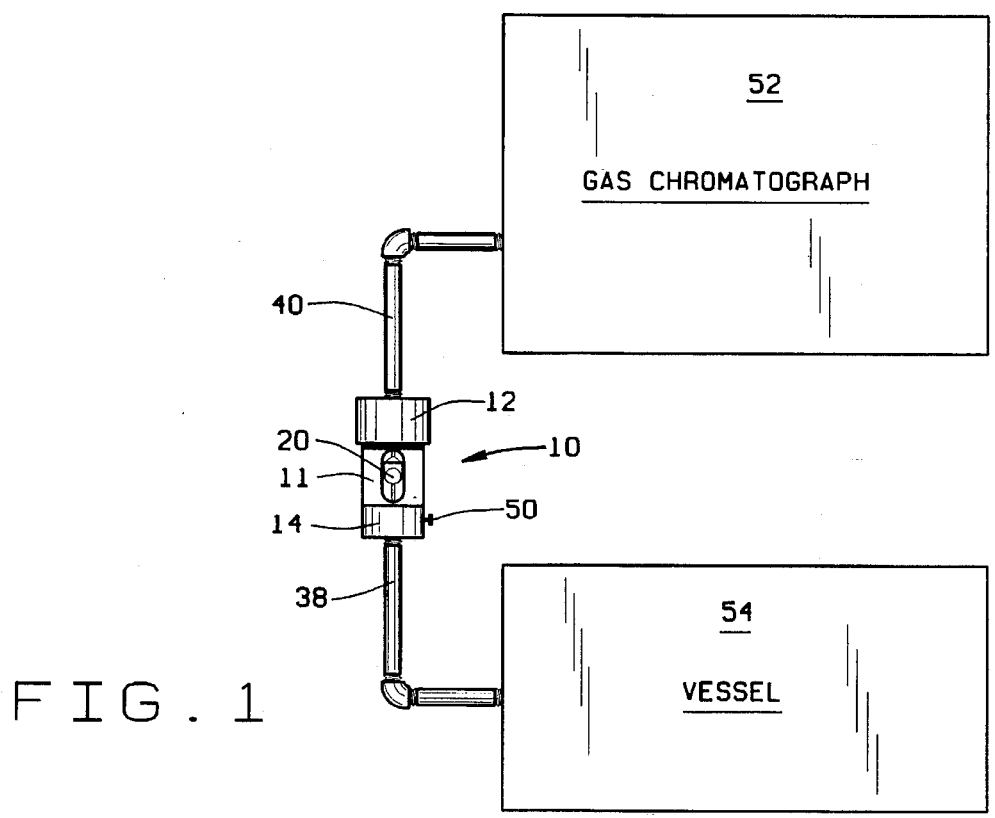
FIG. 1 is a diagrammatic view of the chromatograph protection device of the present invention in communication with a gas chromatograph and a gas containing vessel.

Referring to FIG. 1, a chromatograph protection device 10 according to the invention is shown threadably connected to and in fluid communication with a gas chromatograph 52 and a vessel 54 by means of pipelines 40 and 38, respectively.

The vessel 54, which can be a sample cylinder, pipeline or other storage device, is the source of the gaseous mixture to be separated by the gas chromatograph 52. As will be discussed more thoroughly below, when the gaseous mixture also contains liquids the chromatograph protection device 10 prevents the intrusion of these liquids into the gas chromatograph 52, thereby reducing the incident of chromatograph flooding.

Referring to FIG. 4, the chromatograph protection device 10 has a body 11 defined by an inlet assembly 14 and an outlet assembly 12. The inlet assembly 14 generally includes a cylindrical base 56 having a cylindrical cavity 63 and external threads 64 on one end, an inner transparent generally cylindrical valve assembly 36, comprised of a top valve piece 58 and a bottom valve piece 62 and an outer transparent element 34 comprising a cylindrical sleeve or tube having an elongated cylindrical bore 35. The outlet assembly 12 includes mating threads. The base 56 is fabricated of a solid, opaque material, preferably metal, and having a pair of diametrically opposed slots 30 and 32 on its sides. The inner transparent valve assembly 36 is preferably formed of a polished Plexiglass material. The outer transparent element 34 is in coaxial relation relative to the inner transparent valve assembly 36 and is formed of a high pressure sight glass. The inner transparent valve assembly 36 and the outer transparent assembly 34 are sized to be received in the cylindrical cavity 63 and be seated against a lower base portion 60.

Figure 2:
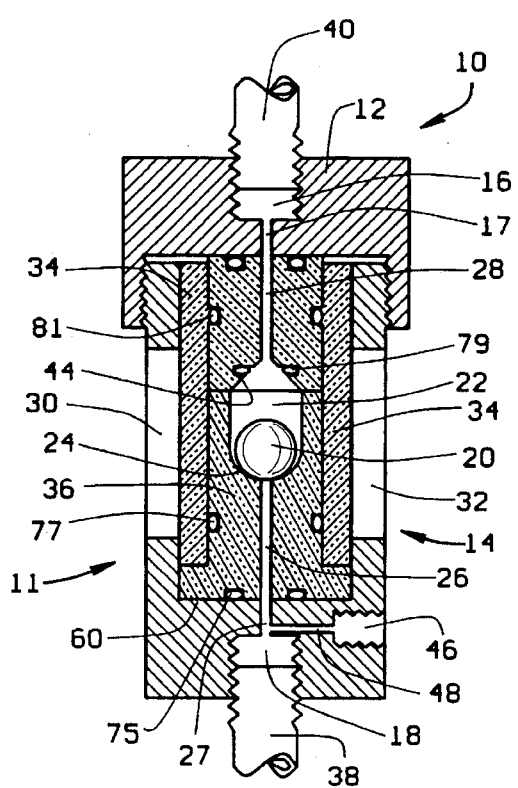
FIG. 2 is a cross-sectional view of the chromatograph protection device of the present invention showing the floatable valve element in the open state positioned on the lower valve seat of the flotation chamber.
Figure 3:
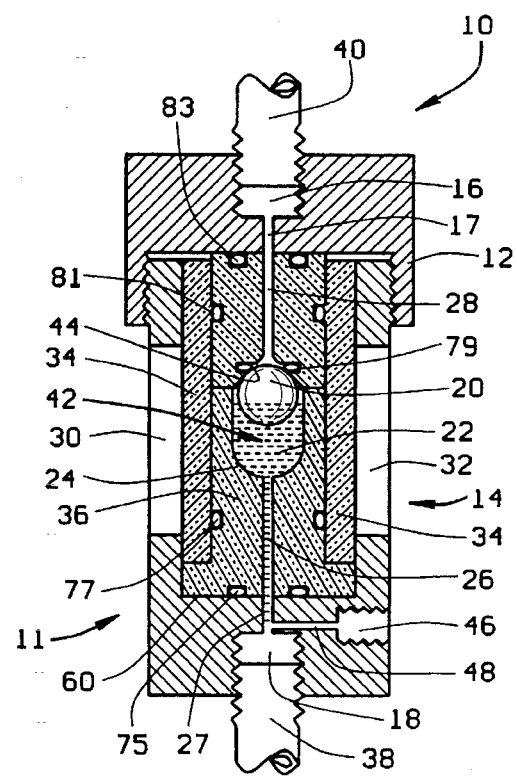
FIG. 3 is a cross-sectional view of the chromatograph protection device of the present invention showing the floatable valve element in the closed state positioned on the upper valve seat of the flotation chamber.

Additionally, referring to FIGS. 2 and 3, the bottom valve piece 62 and the top valve piece 58 of the inner transparent valve assembly 36 together form a flotation chamber 22. The flotation chamber 22 includes a floatable valve element 20 which is preferably a bright-colored spherical ball formed of a chemically non-reactive material. The floatable valve element 20 has a diameter which is slightly smaller than the diameter of the flotation chamber 22, thereby allowing the floatable valve element 20 to move freely within the flotation chamber 22 so that gasses may flow therearound and into the gas chromatograph. The flotation chamber 22 has a seat 24 on its lower end in the bottom valve piece 62, which is a semicircular rim for the floatable valve element 20 to be seated on when no liquids are present. The flotation chamber 22 further has a valve seat 44 positioned in the upper portion of the flotation chamber 22 formed on the top valve piece 58. The valve element 20 seats on the valve seat 44 at the top of the flotation chamber 22 in the closed position, when liquids are present. The flotation chamber 22 is in fluid communication with the inlet port 18 by means of a base channel 27 in the lower position 60 and an inner channel 26, in the bottom valve piece 62. The flotation chamber 22 is in fluid communication with the outlet port 16 in the outlet assembly 12 via an outlet channel 28 in the upper valve piece 58 and an outlet channel 17 in the outlet assembly 12. The outlet assembly 12 of the chromatograph protection device 10 is a cylindrical member of greater diameter than the inlet assembly 14. The outlet assembly 12 is also fabricated of the same solid material as the base 56 of the inlet assembly 14.

The lower portion 60 of the base 56 has a discharge channel 48 which extends transversely from and in fluid communication with the base inlet channel 27. The discharge channel 26 terminates into a discharge port 56. The discharge port 56 can include a valve 50 (shown in FIG. 1) which can be used to selectively relieve pressure within the chromatograph protection device 10.

The bottom valve piece 62 is received in the chamber 63 of the base 56 such that an annular flange 66 abuts the bottom 60. The sleeve 34 is also received in the chamber 63, with the bottom end 68 resting on the upper surface of the flange 66 such that a majority of the bottom valve piece 62 is within the bore 35. The top valve piece 58 is received in the bore 35 of the sleeve 34 such that the bottom 70 of the top valve piece 58 abuts the top 72 of the bottom valve piece 62.

In order to prevent leakage of gas and/or liquid from the chromatograph protection device 10, O-rings are strategically placed therearound. The bottom valve piece 62 has a lower O-ring seat 74 for receipt of an O-ring 75 to seal the bottom 66 of the bottom valve piece 62 against the bottom 60 of the base 56. A further O-ring seat 76 is formed in the bottom valve piece 62 that receives an O-ring 77 to seal the bottom valve piece 62 against the sleeve 34.

The top valve piece 58 includes a lower O-ring seat 78 in which is disposed an O-ring 79 for sealing the valve seat 44 when the floatable valve element 20 is in the closed position. An intermediate O-ring seat 80 is also provided in the top valve piece 58 in which an O-ring 81 is disposed to seal between the top valve piece 58 and the sleeve 34. A top O-ring seat 82 is further provided in which is disposed an O-ring 83 to seal between the top valve piece 58 and the outlet assembly 12.

The operation of chromatograph protection device 10 is as follows. The mixture of gases and liquids exit the vessel 54 via the pipeline 38, enter the inlet port 18 of the chromatograph protection device 10 and through the inlet channels 27, 26 into the flotation chamber 22. The gases are allowed to pass the floatable valve element 20, but the liquids are not. As shown in FIG. 2, when the fluid 42 rises to the level in which the floatable valve element 20 reaches the valve seat 44, communication between the vessel 54 and the gas chromatograph 52 is cut off. When the user observes this through either slot 30 or 32, the valve 50 on the side of the chromatograph protection device 10 can be opened and the pressure can be relieved, thereby allowing further communication of the mixture between the vessel 54 and the gas chromatograph 52.

The chromatograph protection device 10 can be used in high pressure applications and/or setups, up to 2000 psi. Because of this, the use of the chromatograph protection device 10 is not limited to hookup to a vessel as depicted in FIG. 1. The chromatograph protection device 10 can be coupled to the outlet of a probe regulator with the probe regulator mounted to a typical gas pipeline as is well-known in the art. As gas pipelines can reach pressures up to 2000 psi, if the probe regulator should fail and full pipeline pressure reach the chromatograph protection device 10, the chromatograph protection device 10 would not fail. It should, of course, be understood that the hookup configuration may vary.

Accordingly, while this invention is described with reference to a preferred embodiment of the invention, it is not intended to be construed in a limiting sense. It is rather intended to cover any variations, uses or adaptations in the invention utilizing its general principles. Various modifications will be apparent to persons skilled in the art upon reference to this description. It is therefore contemplated that the appended claims will cover any such modifications or embodiments as fall within the true scope of the invention.

What is claimed is:

1. An apparatus for preventing the intrusion of liquids into a gas chromatograph comprising:
   a) a body having an inlet assembly with a vertically extending inlet port coupled to an outlet assembly with a vertically extending outlet port, said inlet assembly including an inner transparent element with a flotation chamber disposed therein, said flotation chamber having an upper and lower portion, said lower portion in fluid communication with said inlet port by means of an inlet channel, said upper portion in fluid communication with said outlet port by means of an outlet channel which extends through said inlet assembly and contiguously through said outlet assembly;
   b) an outer transparent element in coaxial relation relative to said inner transparent element;
   c) a valve seat positioned in the upper portion of said flotation chamber;
   d) a rest positioned in the lower portion of said flotation chamber;
   e) a floatable valve element freely movable within said flotation chamber from said rest to said valve seat in response to the intrusion of liquid into said flotation chamber; and
   f) a pair of slots positioned coaxially on said inlet assembly with respect to said outer transparent element, said slots diametrically opposed from one another to expose said outer transparent element.

2. The apparatus of claim 1, wherein said floatable valve element is spherical member formed of a substantially chemically non-reactive material.

3. The apparatus of claim 1, wherein said inlet assembly and said outlet assembly are separable cylindrical bodies.

4. The apparatus of claim 1, wherein said inlet assembly has an externally threaded end oppositely disposed vertically with respect to said inlet port which is threaded to an internally threaded opening on said outlet assembly oppositely disposed vertically with respect to said outlet port.

5. The apparatus of claim 1, further comprising a discharge port positioned transversely to and in fluid communication with said inlet channel by means of a discharge channel.

6. The apparatus of claim 5, further comprising a valve disposed within said discharge channel for selectively relieving the pressure within said flotation chamber.

7. The apparatus of claim 1, wherein said rest is a semi-circular rim on said lower end of said flotation chamber.

8. The apparatus of claim 1, wherein said upper portion of said flotation chamber is conical shaped and funnels into said outlet channel.

9. The apparatus of claim 8, wherein said valve seat is an O-ring that seals said floatable valve element at the top of said flotation chamber.

10. The apparatus of claim 1, wherein said inner transparent element is a polished Plexiglass material.

11. The apparatus of claim 1, wherein said outer transparent element is a high pressure sight glass.

12. An apparatus for preventing the intrusion of liquids from a gas source into a gas chromatograph, the apparatus comprising:
   a) a cylindrical body having a cylindrical chamber therein that is open at one end and includes an inlet port on an opposite end adapted to be attached to a source of gas, said body including external threads at said open end and a pair of oppositely disposed slots;
   b) a first transparent member disposed in said cylindrical chamber defining a valve chamber in fluid communication with said inlet port through an inlet channel, said first transparent member having a first O-ring disposed at a juncture of said inlet channel and said inlet port, and a second O-ring disposed in a circumferential O-ring groove on an outside surface thereof;
   c) a second transparent member disposed in said cylindrical chamber axially above and abutting said first transparent member, said second transparent member defining an upper valve seat for said valve chamber and having a valve seat O-ring disposed therein, said second transparent member having an outlet channel in fluid communication with said upper valve seat, an intermediate O-ring disposed in a circumferential intermediate O-ring groove in an outer surface thereof, and a top O-ring disposed in the top O-ring groove on a top surface thereof;
   d) a floatable ball freely movably disposed in said valve chamber;
   e) a cylindrical transparent sleeve disposed in said cylindrical chamber radially surrounding said first and second transparent members; and
   f) a cap threadedly coupled to said threaded end of said body, said cap having an outlet port in fluid communication with said outlet channel and adapted to be coupled to the chromatograph.

13. The apparatus of claim 12, wherein said first and second transparent members and said cylindrical sleeve are made of a polished plexiglass.

14. The apparatus of claim 12, further comprising a relief valve in fluid communication with said inlet port.

* * * * *